| (12) | United States Patent | (10) Patent No.: | US 11,036,830 B2 |
|---|---|---|---|
| | Burchard | (45) Date of Patent: | Jun. 15, 2021 |

(54) SYSTEMS AND METHODS FOR PERFORMING COUNTING AND SUMMING USING A QUANTUM COMPUTER

(71) Applicant: Goldman Sachs & Co. LLC, New York, NY (US)

(72) Inventor: Paul Burchard, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 20 days.

(21) Appl. No.: 16/275,618

(22) Filed: Feb. 14, 2019

(65) Prior Publication Data

US 2019/0258696 A1 Aug. 22, 2019

Related U.S. Application Data

(60) Provisional application No. 62/632,119, filed on Feb. 19, 2018, provisional application No. 62/681,746, filed on Jun. 7, 2018, provisional application No. 62/744,520, filed on Oct. 11, 2018.

(51) Int. Cl.
| | | |
|---|---|---|
| *G06F 17/18* | (2006.01) | |
| *G06N 10/00* | (2019.01) | |
| *G06F 17/14* | (2006.01) | |
| *G06Q 99/00* | (2006.01) | |

(Continued)

(52) U.S. Cl.
CPC ............. *G06F 17/18* (2013.01); *G06F 17/14* (2013.01); *G06N 5/003* (2013.01); *G06N 10/00* (2019.01); *G06Q 10/04* (2013.01); *G06Q 99/00* (2013.01)

(58) Field of Classification Search
CPC .......... G06F 17/14; G06F 17/18; G06N 10/00
See application file for complete search history.

(56) References Cited

U.S. PATENT DOCUMENTS 7,113,967 B2 * 9/2006 Cleve ..................... G06N 10/00
708/403
2005/0133780 A1 6/2005 Azuma
(Continued)

OTHER PUBLICATIONS

Applebaum et al., "Low-Complexity Cryptographic Hash Functions", 8th Innovations in Theoretical Computer Science (ITCS), 2017, 31 pages.

(Continued)

*Primary Examiner* — Michael D. Yaary (57) ABSTRACT

A method for solving a computational problem reducible to a problem of summing probabilities over all solutions to a decision problem includes using a quantum computer to identify a coarse estimate of a sum of the probabilities over all solutions to the decision problem. The method also includes using the quantum computer to identify a finer estimate of the sum. The finer estimate is determined using a quantum amplitude estimation algorithm in which a number $m$ in a number register controls a number $R \times m$ of quantum amplitude amplification iterations to be applied to a solution space register (where $R$ is a specified multiple) and a quantum Fourier transform is applied to the number register. The method further includes using the coarse estimate to de-alias the finer estimate over all solutions. In addition, the method includes outputting a solution to the computational problem determined using the de-aliased finer estimate.

27 Claims, 4 Drawing Sheets

(51) Int. Cl.
G06Q 10/04 (2012.01)
G06N 5/00 (2006.01)

(56) References Cited

U.S. PATENT DOCUMENTS

| | | | | |
|---|---|---|---|---|
| 2008/0140749 | A1* | 6/2008 | Amato | B82Y 10/00 |
| | | | | 708/490 |
| 2009/0164435 | A1* | 6/2009 | Routt | B82Y 10/00 |
| 2015/0081565 | A1 | 3/2015 | Roullier et al. | |
| 2017/0286858 | A1 | 10/2017 | La Cour et al. | |
| 2017/0364796 | A1 | 12/2017 | Wiebe et al. | |
| 2018/0096258 | A1 | 4/2018 | Burchard et al. | |
| 2018/0189653 | A1 | 7/2018 | Burchard | |
| 2019/0129916 | A1 | 5/2019 | Hidaka | |

OTHER PUBLICATIONS

Brassard et al., "Quantum Counting", May 1998, 12 pages.
Ermon et al., "Optimization with Parity Constraints: From Binary Codes to Discrete Integration", UAI'13 Proceedings of the Twenty-Ninth Conference on Uncertainty in Artificial Intelligence, Aug. 2013, 10 pages.
Nachtergaele, "Quantum Spin Systems", Sep. 2004, 10 pages.
Rotteler et al., "A quantum circuit to find discrete logarithms on ordinary binary elliptic curves in depth O(log2n)", Nov. 2013, 13 pages.
Shaltiel et al., "Pseudorandomness for Approximate Counting and Sampling", Electronic Colloquium on Computational Complexity, Report No. 86, Oct. 2004, 24 pages.
Rjlipton, "Gödel's Lost Letter and P=NP: a personal view of the theory of computation, Stockmeyer's Approximate Counting Method", Blog post, Aug. 2009, 11 pages.
Thompson et al., "Quantum computing with black-box subroutines", Nov. 2013, 8 pages.
Paul H. Burchard, "Quantum Solver for Financial Calculations", U.S. Appl. No. 14/592,876, filed Jan. 8, 2015, 34 pages.
Abrams et al., "Nonlinear quantum mechanics implies polynomial-time solution for NP-complete and #P problems", Jan. 1998, 10 pages.
Bernstein, "Cost analysis of hash collisions: Will quantum computers make SHARCS obsolete?", May 2009, 12 pages.
Valiant et al., "NP is as Easy as Detecting Unique Solutions", Theoretical Computer Science 47, 1986, pp. 85-93.
Aaronson, "NP-complete Problems and Physical Reality", Feb. 2005, 23 pages.
Kutzkov, "New upper bound for the #3-SAT Problem", Information Processing Letters 105, Nov. 2006, 5 pages.
Stockmeyer, "On Approximation Algorithms for #P*", SIAM Journal on Computing, vol. 14, No. 4, Nov. 1985, 13 pages.
Florio et al., "Quantum Implementation of Elementary Arithmetic Operations", Mar. 2004, 11 pages.
Grover et al., "Is Partial Quantum Search of a Database Any Easier?", Feb. 2005, 15 pages.
Hoyer et al., "Lower Bounds on Quantum Query Complexity", Sep. 2005, 23 pages.
Grover et al., "Quantum search for multiple items using parallel queries", Jul. 2004, 6 pages.
Zalka, "Grover's quantum searching algorithm is optimal", Dec. 1999, 13 pages.
Montanaro, "Quantum speedup of Monte Carlo methods", The Royal Society Publishing, May 2015, 20 pages.
Heinrich, "Quantum Summation with an Application to Integration", May 2001, 48 pages.
Fischlin et al., "Security-Amplifying Combiners for Collision-Resistant Flash Functions", Annual International Cryptology Conference, 2007, 18 pages.
Brassard et al., "An optimal quantum algorithm to approximate the mean and its application for approximating the median of a set of points over an arbitrary distance", May 2011, 10 pages.
Montanaro, "Quantum speedup of Monte Carlo methods", Jul. 2017, 28 pages.
Brassard et al., "Quantum Amplitude Amplification and Estimation", May 2000, 32 pages.
Hasegawa et al., "Theoretical Analyses of Quantum Counting against Decoherence Errors", Mar. 2005, 22 pages.
Boyer et al., "Tight bounds on quantum searching", PhysComp96, May 1996, 8 pages.
Diao et al., "Quantum Counting: Algorithm and Error Distribution", Acta Applicandae Mathematicae, vol. 118, No. 1, Feb. 2012, pp. 147-159.
Liu et al., "A Parallel Quantum Algorithm for the Satisfiability Problem", Communications in Theoretical Physics, vol. 49, No. 3, Mar. 2008, pp. 629-630.
Long, "Search an unsorted database with quantum mechanics", Frontiers of Computer Science in China, vol. 1, No. 3, Jul. 2007, pp. 247-271.
Long, "Grover Algorithm with zero theoretical failure rate", Cornell University Library, Jun. 2001, 5 pages.
International Search Report dated May 22, 2019 in connection with International Patent Application No. PCT/US2019/017974, 4 pages.
Written Opinion of the International Searching Authority dated May 22, 2019 in connection with International Patent Application No. PCT/US2019/017974, 10 pages.
Office Action dated Nov. 18, 2020 in connection with U.S. Appl. No. 15/699,669, 15 pages.
Ablayev et al., "Quantum Hashing", Oct. 2013, 11 pages.
Office Action dated Aug. 3, 2020 in connection with U.S. Appl. No. 15/699,669, 35 pages.
Office Action dated May 7, 2021 in connection with U.S. Appl. No. 15/906,217, 8 pages.

* cited by examiner

SYSTEMS AND METHODS FOR PERFORMING COUNTING AND SUMMING USING A QUANTUM COMPUTER

CROSS-REFERENCE TO RELATED APPLICATIONS AND PRIORITY CLAIM

This application claims priority under 35 U.S.C. § 119(e) to U.S. Provisional Patent Application No. 62/632,119 filed on Feb. 19, 2018; U.S. Provisional Patent Application No. 62/681,746 filed on Jun. 7, 2018; and U.S. Provisional Patent Application No. 62/744,520 filed on Oct. 11, 2018. All of these provisional applications are hereby incorporated by reference in their entirety.

TECHNICAL FIELD

This disclosure generally relates to quantum computing systems. More specifically, this disclosure relates to systems and methods for performing counting and summing using a quantum computer.

BACKGROUND

Many important or useful computations can be expressed as counting problems. For example, Monte Carlo simulations are used in a large number of applications. In its simplest form, a Monte Carlo simulation attempts to count the size of a set by randomly sampling from a given space and seeing which samples fall within or "hit" the set. More generally, a Monte Carlo simulation attempts to compute the integral of a function over a given space, which can be reformulated as counting the size of a set underneath a graph of the function.

Monte Carlo simulation is a very general and robust technique. However, the error of the count computed using a Monte Carlo simulation decays at a rate of $1/\sqrt{N}$, where N denotes the amount of work performed in the simulation. "Quasi" Monte Carlo techniques have been developed in which the error of the count eventually decays at a rate of around $1/N$. Unfortunately, quasi Monte Carlo techniques suffer from an additional performance penalty of $(\log N)^D$, which eventually becomes much smaller than N but is exponential in the number of dimensions D of the given space. Thus, quasi Monte Carlo techniques are practical only for very low-dimensional spaces.

SUMMARY

This disclosure provides systems and methods for performing counting and summing using a quantum computer.

In a first embodiment, a method for solving a computational problem that is reducible to a problem of summing probabilities over all solutions to an associated decision problem includes using a quantum computer to identify a coarse estimate of a sum of the probabilities over all solutions to the associated decision problem. The method also includes using the quantum computer to identify a finer estimate of the sum of the probabilities over all solutions to the associated decision problem. The finer estimate of the sum of the probabilities over all solutions is determined using a quantum amplitude estimation algorithm in which (i) a number m in a number register controls a number R×m of quantum amplitude amplification iterations to be applied to a solution space register (where R is a specified multiple) and (ii) a quantum Fourier transform is applied to the number register. The method further includes using the coarse estimate of the sum of the probabilities over all solutions to de-alias the finer estimate of the sum of the probabilities over all solutions. In addition, the method includes outputting a solution to the computational problem determined using the de-aliased finer estimate of the sum of the probabilities over all solutions to the decision problem.

In a second embodiment, an apparatus includes a quantum computer having at least one quantum circuit. To solve a computational problem that is reducible to a problem of summing probabilities over all solutions to an associated decision problem, the quantum computer is configured to identify a coarse estimate of a sum of the probabilities over all solutions to the associated decision problem, identify a finer estimate of the sum of the probabilities over all solutions to the associated decision problem, and use the coarse estimate of the sum of the probabilities over all solutions to de-alias the finer estimate of the sum of the probabilities over all solutions. The finer estimate of the sum of the probabilities over all solutions is determined using a quantum amplitude estimation algorithm in which (i) a number m in a number register controls a number R×m of quantum amplitude amplification iterations to be applied to a solution space register (where R is a specified multiple) and (ii) a quantum Fourier transform is applied to the number register. A solution to the computational problem is determined using the de-aliased finer estimate of the sum of the probabilities over all solutions to the decision problem.

In a third embodiment, a system includes a quantum computer having at least one quantum circuit and a classical computer having at least one processor configured to execute instructions stored in at least one memory. To solve a computational problem that is reducible to a problem of summing probabilities over all solutions to an associated decision problem, the quantum computer is configured to identify a coarse estimate of a sum of the probabilities over all solutions to the associated decision problem, the quantum computer is configured to identify a finer estimate of the sum of the probabilities over all solutions to the associated decision problem, and the classical computer is configured to use the coarse estimate of the sum of the probabilities over all solutions to de-alias the finer estimate of the sum of the probabilities over all solutions. The finer estimate of the sum of the probabilities over all solutions is determined using a quantum amplitude estimation algorithm in which (i) a number m in a number register controls a number R×m of quantum amplitude amplification iterations to be applied to a solution space register (where R is a specified multiple) and (ii) a quantum Fourier transform is applied to the number register. A solution to the computational problem is determined using the de-aliased finer estimate of the sum of the probabilities over all solutions to the decision problem.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, many important or useful computations (such as Monte Carlo simulations) can be thought of or implemented as counting problems. The error associated with a conventional Monte Carlo simulation decays at a rate of $1/\sqrt{N}$, while quasi Monte Carlo techniques can achieve a decay rate of $1/N$ but suffer from an additional performance penalty of $(\log N)^D$ that is practical only for very low dimensional spaces. Computers based on quantum mechanics (referred to as "quantum computers" or "quantum computing systems") are believed to be more powerful than those based on classical mechanics, such as standard digital electronic computers.

This disclosure provides techniques for computations on quantum computing hardware using quantum counting or quantum summing. A quantum computer is a computational device that uses quantum mechanics, and quantum computing exploits quantum mechanical phenomena (such as superposition and entanglement) to perform operations on data. A quantum computer is fundamentally different from a classical computer. A classical computer is a two-state system that is characterized by the use of multiple bits, each of which can only have one of two values (a "0" or a "1"). In contrast, a quantum computer can exist in a superposition of states. The building block of a quantum computer is a quantum bit or "qubit," and each qubit can represent a "1," a "0," or any superposition of the two states. In general, an n-qubit quantum computer can exist in any superposition of $2^n$ states simultaneously, while au n-bit classical computer can exist in only one of the $2^n$ states at a given time.

In accordance with this disclosure, quantum computing hardware is used to perform fast quantum counting or quantum summing to solve various classes of calculations, such as averages, integrations, volumes, and percentiles. This is accomplished by reducing a calculation to a counting or summing problem and solving the counting or summing problem efficiently using quantum computing hardware. As described below, a count or sum can be estimated by the quantum computer using a quantum algorithm, such as a modified version of the Brassard-Hoyer-Tapp algorithm or more generally a modified version of a quantum amplitude estimation algorithm. These algorithms for quantum computers allow the error of a count or sum to decay at a rate of $1/N$ for sequential work without any additional penalty in N. In some embodiments, for instance, to accelerate a computation using a quantum computer, a problem can be carefully divided into pieces (also referred to as sets), and each set can be computed efficiently using a quantum algorithm such that combining the results from the various sets results in a precise overall solution to the problem.

It should be noted that the standard quantum amplitude estimation algorithm depends on unnecessarily fine cancellations, which may not be robust to noise in real quantum systems. This disclosure therefore also describes how some embodiments improve the Brassard-Hoyer-Tapp algorithm, and more generally improve the quantum amplitude estimation algorithm, in order to make quantum counting and summing operations more robust in the presence of noise in a quantum computing system.

Note that various models of quantum computing exist, where different quantum computing models correspond to different ways of exploiting superposition and entanglement of quantum mechanics. For example, "gate model" quantum computers apply a sequence of unitary "gate" operators to a prepared quantum system before making a quantum measurement. "Annealing model" quantum computers gradually freeze a quantum system into a low energy state, allowing quantum tunneling to occur during the process. "Topological" quantum computers use qubits in topologically-constrained states that are less sensitive to noise. "Measurement model" quantum computers prepare an entangled state of all qubits and then apply a series of conditional measurements to that state, and these measurements can be designed to emulate any sequence of gates (including those described below in terms of gates). In the following description, one or more specific quantum computing models may be described as being used to perform computations using quantum counting or summing. However, any suitable quantum computing model (now known or later developed) could be used to support computations using quantum counting or summing as described in this disclosure.

Figure 1:
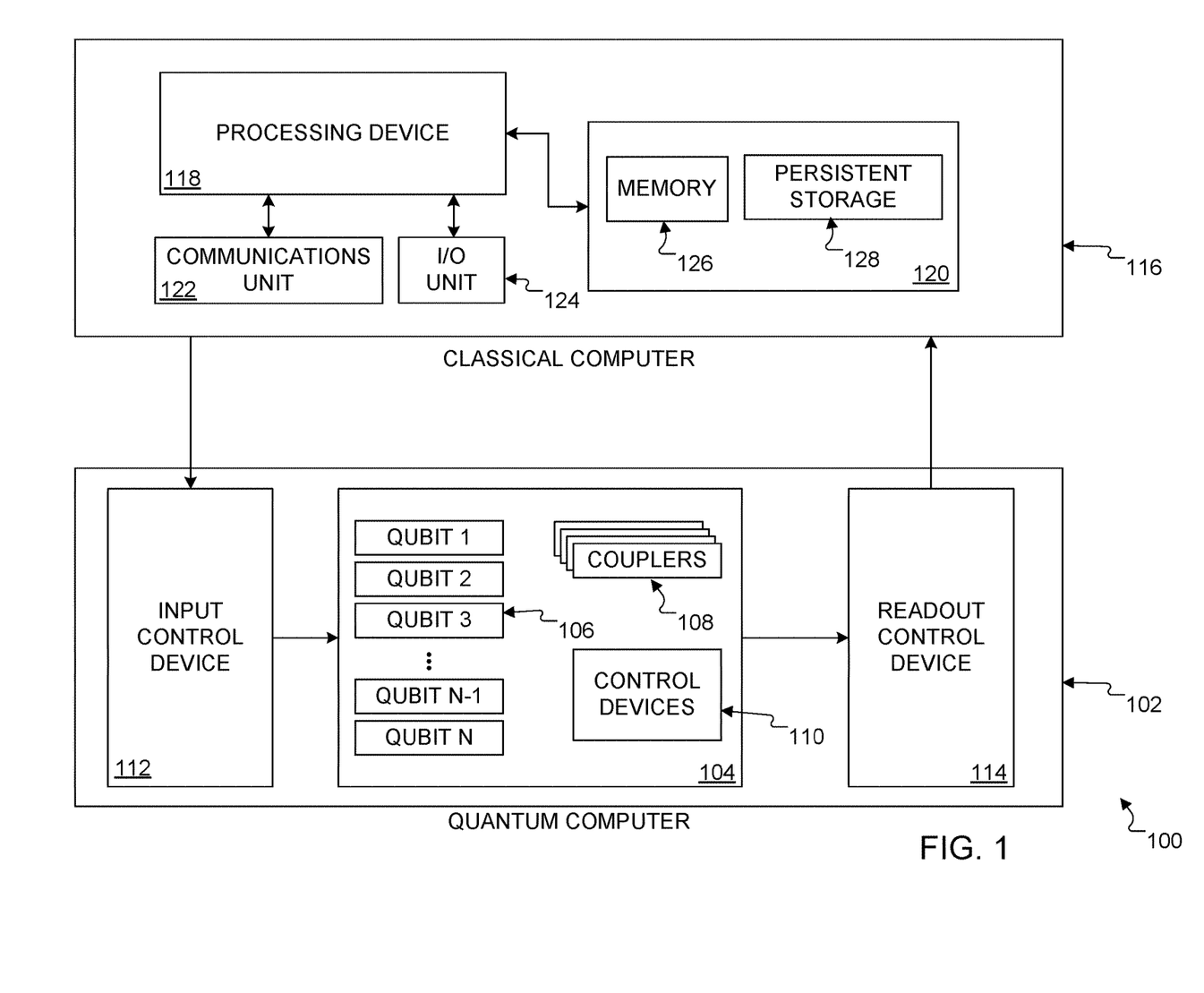
FIG. 1 illustrates an example system for performing quantum counting and summing according to this disclosure.

FIG. 1 illustrates an example system 100 for performing quantum counting and summing according to this disclosure. As shown in FIG. 1, the system 100 implements or includes a quantum computing system 102, which includes at least one quantum circuit 104. In this example, each quantum circuit 104 includes or operates using multiple qubits 106 and multiple couplers 108 that provide connectivity between the qubits 106. Each quantum circuit 104 also includes one or more control devices 110 that can affect the qubits 106.

Each qubit 106 denotes any suitable structure configured to implement a quantum bit. Any suitable physical implementations of the qubits 106 (now known or later developed) could be used, such as those that use photons, atoms, ions, atomic nuclei, electrons, optical lattices, Josephson junctions, or quantum dots. Each coupler 108 denotes any suitable structure configured to facilitate interactions between qubits. Any suitable physical implementations of the couplers 108 (now known or later developed) could be used, including those that allow interactions between two qubits 106 and those that allow interactions between more than two qubits 106. Each control device 110 denotes any suitable structure configured to change a state or other characteristic of one or more qubits. Any suitable physical implementations of the control devices 110 (now known or later developed) could be used, such as those that can alter the states of photons, atoms, ions, atomic nuclei, electrons, optical lattices, Josephson junctions, or quantum dots. In some embodiments, the control devices 110 can generate magnetic fields to alter the qubits 106.

In some embodiments, the quantum computing system 102 can include at least one input control device 112 and at least one readout control device 114 that facilitate input/output communications between the quantum computing system 102 and a classical computing system 116. For example, the input control device 112 could receive input data defining a type of problem to be solved or data associated with the problem to be solved, and the readout control device 114 could facilitate read-out of the qubits 106 after the qubits 106 have reached their final computational states. Each control device 112, 114 includes any suitable structure facilitating interactions with an external computing device or system.

In this example, the classical computing system 116 includes at least one processing device 118, at least one storage device 120, at least one communications unit 122, and at least one input/output (I/O) unit 124. The processing device 118 executes instructions that may be loaded into a memory 126. The processing device 118 includes any suitable number(s) and type(s) of processors or other devices in any suitable arrangement. Example types of processing devices 118 include microprocessors, microcontrollers, digital signal processors, field programmable gate arrays, application specific integrated circuits, and discrete circuitry.

The memory device 126 and a persistent storage 128 are examples of storage devices 120, which represent any structure(s) capable of storing and facilitating retrieval of information (such as data, program code, and/or other suitable information on a temporary or permanent basis). The memory device 126 may represent a random access memory or any other suitable volatile or non-volatile storage device(s). The persistent storage 128 may contain one or more components or devices supporting longer-term storage of data, such as a read only memory, hard drive, Flash memory, or optical disc.

The communications unit 122 represents an interface that supports communications with other systems or devices. For example, the communications unit 122 could include a network interface card or a wireless transceiver facilitating communications over a wired or wireless network. The communications unit 122 may support communications through any suitable physical or wireless communication link(s).

The I/O unit 124 allows for input and output of data. For example, the I/O unit 124 may provide a connection for user input through a keyboard, mouse, keypad, touchscreen, or other suitable input device. The I/O unit 124 may also send output to a display, printer, or other suitable output device.

In some embodiments, pre-processing and/or post-processing can be handled by components of the classical computing system 116, while the quantum computing system 102 handles fast and possibly noise-robust computations using quantum counting or summing as described this patent document. In other embodiments, the quantum computing system 102 operates as a standalone device (without a classical computing system 116) and performs fast and possibly noise-robust computations using quantum counting or summing as described this patent document. When implemented as a standalone device, the quantum computing system 102 may or may not be networked with or otherwise connected to other machines. In a networked deployment, the quantum computing system 102 may operate in the capacity of a server or a client machine in a client-server network environment or as a peer machine in a peer-to-peer or distributed network environment.

Many computer simulations of practical importance can be performed using Monte Carlo simulations that involve a large or infinite number of scenarios. For example, in statistical physics, the value of a macroscopic variable denotes an average of a microscopic variable over all microscopic states of a system, where the states can be drawn from a Boltzmann distribution or other distribution. As another example, in computer graphics, a color value of an image pixel denotes an average of the light reaching the pixel along all possible rays, including reflections and scattering. As yet another example, a financial security can be priced as an average discounted payoff across all risk-neutral scenarios. The described approaches for supporting Monte Carlo simulations using quantum counting or summing can provide faster and possibly more robust simulation results, thereby improving the accuracy of the computer simulations and thereby the functioning of the overall system itself.

Although FIG. 1 illustrates one example of a system 100 for performing quantum counting and summing, various changes may be made to FIG. 1. For example, while shown as being separate systems, various components of the quantum computing system 102 and the classical computing system 116 could be combined into a single apparatus or system. As a particular example, one, some, or all of the components of the classical computing system 116 could be used in the quantum computing system 102. This may allow, for instance, the quantum computing system 102 to transmit/receive data over at least one network via the communications unit(s) 122 or to transmit/receive I/O data via the I/O unit(s) 124.

As noted above, various computations can be implemented as counting or summing problems, and these computations can be performed quickly using quantum counting or summing on quantum computing hardware (which may be referred to as a "quantum counter or summer"). A quantum counter or summer could be used in a variety of applications. For example, a quantum counter or summer could be used to solve the following three general classes of calculations (namely because all of these classes of calculations can be translated into corresponding counting or summing problems):

(1) Tail calculations: Over a large set of inputs x, find the $p^{th}$ percentile value of $f(x)$.

(2) Integration calculations: Over a large set of inputs x, find the sum or average of $f(x)$.

(3) American integration calculations: Over a large set of inputs $x=(x_1, \ldots, x_d)$, find the iterated average $p(\ )$ where inductively $p(x_1, \ldots, x_d)=f(x_1, \ldots, x_d;$ average $p(x_1, \ldots, x_{d+1}))$ for some $f$.

For problem class (1) above, the calculation can be reduced to a problem of counting x such that $f(x)<c$ and then performing a binary search for the correct value of c.

For problem class (2) above, the calculation of the average of $f(x)$ can be turned into a problem of counting points under a graph off In more detail, it can be assumed, without a loss of generality, that $f(x)$ takes values in non-negative integers v with d bits (enough for the desired accuracy). Up to further scaling, the average to be computed is the sum of this $f(x)$ over all x having D bits. This sum amounts to counting the solutions to the following problem: consider strings (x, y) of D+d bits and declare such an (x, y) to be in the set to be counted if $y<f(x)$.

For problem class (3) above, the conditional average $a(x_1, \ldots, x_d)=\text{average}_{x_{d+1}} p(x_1, \ldots, x_{d+1})$ is represented as the least squares best fit of some chosen functional forms, $a(x_1, \ldots, x_d)=\Sigma_i c_i p_i(x_1, \ldots, x_{d+1})$, resulting in the inductive conclusion that $p(x_1, \ldots, x_d)=f(x_1, \ldots, x_d; \Sigma_i c_i p_i(x_1, \ldots, x_d))$ once the $c_i$ values have been determined. To determine the $c_i$ values, the solution of the least squares best fit involves the calculation of the averages of the functions $p(x_1 \ldots, x_{d+1})p_i(x_1, \ldots, x_d)$ and $p_i(x_1, \ldots, x_d)p_j(x_1, \ldots, x_d)$ over all truncated inputs $(x_1, \ldots, x_{d+1})$. These function averages can be computed in the same manner as in problem class (2) above.

Quantum computers are more naturally suited for decision problems (such as finding a solution) rather than counting or summing problems (such as finding out how many solutions there are). In this document, an NP (non-deterministic polynomial time) class of problems denotes problems whose solutions can be verified quickly by a deterministic classical machine in polynomial time. Also, a #P class of problems denotes problems that count or sum the number of solutions to a decision problem in the NP class. The #P class is clearly at least as difficult to solve as the NP class and is conjecturally harder to solve. Classical computing systems generally require exponential time to solve NP problems and an even greater exponential time to solve #P problems.

In some embodiments of this disclosure, a quantum computer is able to count solutions S in an ambient set X in order to solve a #P problem (which is related to an NP decision problem with the solutions S). To accomplish this, techniques are provided for using a quantum computer with parallel quantum computing resources of size P and running time T to be able to estimate the size with relative error $$\frac{\sqrt{|X|/|S|}}{T\sqrt{P}}.$$

If there is some additional knowledge about S (such as knowledge that S is contained in a suitable smaller set R in X as will be described below), the relative error can be improved to $$\frac{\sqrt{|R|/|S|}}{T\sqrt{P}}.$$

Note that in terms of total computing resources N=P×T, a completely serial version (P=1) of a counting problem has 1/N convergence, while a completely parallel version (T=1) of the counting problem has only $1/\sqrt{N}$ convergence (which is no better than classical Monte Carlo run in parallel). Moderate amounts of quantum parallelism have intermediate performance. Although the performance pre-factor $\sqrt{|X|/|S|}$ is in principle exponentially large, in many practical problems the original problem can be rescaled to make this factor manageable. Techniques to perform this rescaling are typically called "importance sampling."

The serial quantum summing or counting algorithm of this disclosure works on an ambient set X consisting of all numbers less than |X| and counts a subset S of X with a relative error $$\frac{\sqrt{|X|/|S|}}{T}$$

in running time T. This can be parallelized by dividing X into P disjoint pieces (sets) and summing the counts of S in all pieces. To apply the serial quantum summing or counting algorithm to the sets, these sets should be transformable into sets of the form of all numbers less than a given one. Also, to achieve a $1/\sqrt{P}$ reduction in relative counting error with P sets (which would be expected if there are statistically independent, identically distributed errors), the counts of S in all sets should be approximately equal, and the counting errors in all sets should be randomly distributed across the sets.

Thus, to enable efficient parallel quantum summing or counting, the following conditions should be met for the sets $R_1, \ldots, R_p$. First, the sets $R_1, \ldots, R_p$ should be disjoint. Second, each set $R_i$ should be enumerable, meaning there is a set $Z_i$ consisting of all numbers less than $|Z_i|$ and there is an enumeration function $r_i: Z_i \to R_i$ that hits every element of $R_i$ exactly once. Third, each set $R_i$ should be pseudo-random. Fourth, the sets $R_1, \ldots, R_p$ should have approximately equal sizes. Note that it is not required that $R=R_1 \cup R_2 \cup \ldots \cup R_p$ be all of X This can be useful if there is some a priori information that reduces the search for the set S. However, in order to avoid missing elements of S, S should be contained in R.

In some embodiments, to show how sets $R_1, \ldots, R_p$ could be constructed to satisfy all of these conditions, start with a pseudo-random sequence $r(z)=\theta z \bmod |X|$ in the case when R=X, where $\theta$ is a random number relatively prime to $|X|$. This sequence hits every element of X exactly once as z ranges over $0, 1, \ldots, |X|-1$. This can be converted into P disjoint, enumerable, equal-sized, pseudo-random sets by interleaving P subsequences of this sequence. Let $r_i(z)=\theta(Pz+i) \bmod |X|$ for z ranging over $0, 1, \ldots, |X|P-1$, and define the set $R_i$ to be the image of the enumeration function $r_i$.

Once the sets $R_i$ are defined, the serial quantum summing or counting algorithm can be run in parallel on each enumeration set $Z_i$ in order to count the number of z such that the query operator $r_i(z) \in S$ is true. Note that if the size of $Z_i$ is not exactly a power of two, it can be rounded up to a power of two, such as by augmenting the query operator to also check that z is less than the original size $|Z_i|$, so that the quantum counting algorithm can be run.

In running time T, this approach enables the simultaneous measurement of the sums over or sizes of the intersections $|S \cap R_i|$ to relative error $$\frac{\sqrt{|R_i|/|S \cap R_i|}}{T}.$$

Because the sets $R_i$ are approximately equal-sized and pseudo-random, it can be expected that the $|S \cap R_i|$ values are approximately equal for all sets, that $\sqrt{|R_i|/|S \cap R_i|} \approx |R|/|S|$, and that the relative error of the different estimates is randomly distributed with the resulting standard deviation of $$\frac{\sqrt{|R|/|S|}}{T}.$$

By standard statistics, the sum of the estimates of $|S \cap R_i|$ is thus an estimate of $|S|$ with relative error $$\frac{\sqrt{|R|/|S|}}{T\sqrt{P}}.$$

Figure 2:
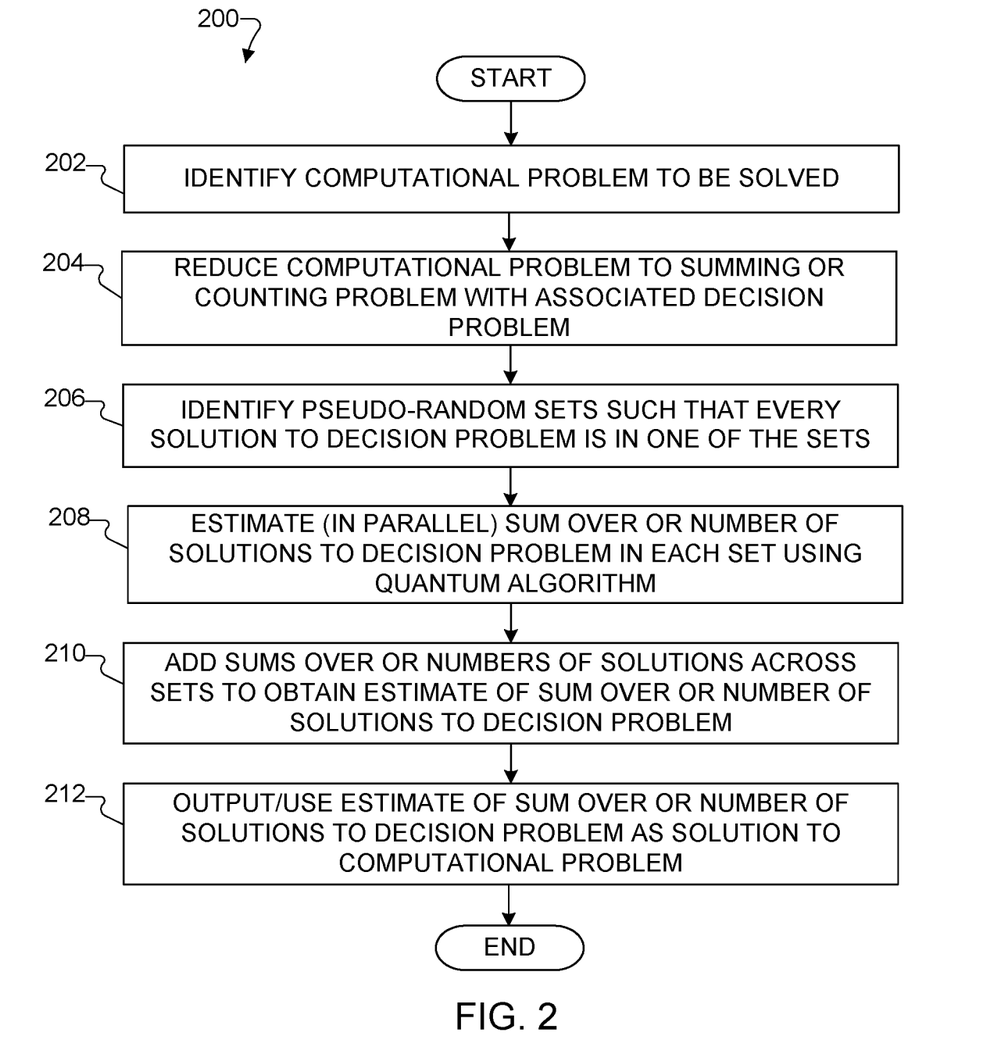
FIG. 2 illustrates an example method for performing quantum summing or counting according to this disclosure.

FIG. 2 illustrates an example method 200 for performing quantum summing or counting according to this disclosure. For ease of explanation, the method 200 of FIG. 2 is described as being used with the system 100 of FIG. 1. However, the method 200 could be used with any other suitable device or system.

As shown in FIG. 2, a computational problem to be solved is identified at step 202, and the computational problem is reduced to a summing or counting problem having an associated decision problem at step 204. This could include, for example, identifying a computational problem in the NP class involving an average, integration, volume, or percentile and generating a corresponding counting problem in the #P class. As a particular example, this could involve identifying one of the three classes of problems discussed above (tail, integration, or American integration calculations) and identifying a corresponding counting problem. Note that these steps could be performed manually or in a partially or fully automated manner, such as by using a classical computing system 116.

In some embodiments, the computational problem involves finding a percentile of a function $f(x)$ over a large number of inputs x, and the associated decision problem is to decide whether there is an x such that $f(x)<c$ for a given c. In other embodiments, the computational problem involves finding an average, sum, or integral of a function $f(x)$ over a large number of inputs x, and the associated decision problem is to decide whether there is a pair (x, y) for which $y<f(x)$. In still other embodiments, the computational problem involves finding a conditional expectation p( ) over a large number of inputs $(x_1, \ldots, x_d)$, where $p(x_1, \ldots, x_d)=f(x_1, \ldots, x_d; \text{average}_{x_{d+1}} p(x_1, \ldots, x_{d+1}))$ for some function $f( )$ over truncated inputs $(x_1, \ldots, x_d; a)$. Here, the computational problem is partially reduced to the problem of computing averages of $p(x_1, \ldots, x_d)$ $p_i(x_1, \ldots, x_d)$ and $p_i(x_1, \ldots, x_d)p_j(x_1, \ldots, x_d)$ over the truncated inputs $(x_1, \ldots, x_{d+1})$, where $p_i$ and $p_j$ denote regression functions.

The summing or counting problem is solved as shown in steps 206-210. For example, multiple pseudo-random sets are identified such that every solution to the decision problem is in one of the sets at step 206. This could include, for example, choosing the sets $R_i$ as described above. This step could be performed manually or in a partially or fully automated manner, such as by using a classical computing system 116. In parallel, the sum over or number of solutions that fall within or intersect each set is identified using a quantum algorithm at step 208. This could include, for example, using the quantum computing system 102 and the serial quantum amplitude estimation algorithm of this disclosure as described below with reference to FIGS. 3 and 4. The sum over or numbers of solutions across the sets are summed to obtain an estimated count of the total sum over or number of solutions to the decision problem at step 210. This step could be performed manually or in a partially or fully automated manner, such as by using a classical computing system 116.

The estimated sum over or count of the solutions to the decision problem is output or used as a solution to the computational problem at step 212. This could include, for example, the quantum computing system 102 or the classical computing system 116 using the estimated sum over or number of solutions as the solution to the computational problem in the NP class.

Although FIG. 2 illustrates one example of a method 200 for performing quantum summing or counting, various changes may be made to FIG. 2. For example, while shown as a series of steps, various steps in FIG. 2 could overlap, occur in parallel, or occur any number of times. Also, the parallel estimation operation in step 208 of FIG. 2 could be performed using a quantum computing system that includes at least one quantum circuit configured to perform the quantum counting. The other operations in FIG. 2 may or may not be performed by the quantum computing system, such as when certain functions are performed by a classical computing system that interacts with the quantum computing system via an input control device 112 and a readout control device 114.

In other embodiments of this disclosure, a quantum computer is able to serially count or sum solutions S in an ambient set X in order to solve a #P problem (which is related to an NP decision problem with the solutions S). To accomplish this, techniques are provided for using a quantum counter or summer that supports the use of a modified noise-robust Brassard-Hoyer-Tapp quantum algorithm in a quantum circuit, which could be implemented within the quantum computing system 102. More generally, the serial quantum counter or summer can support the use of a modified noise-robust quantum amplitude estimation algorithm in a quantum circuit, which could be implemented within the quantum computing system 102.

Figure 3:
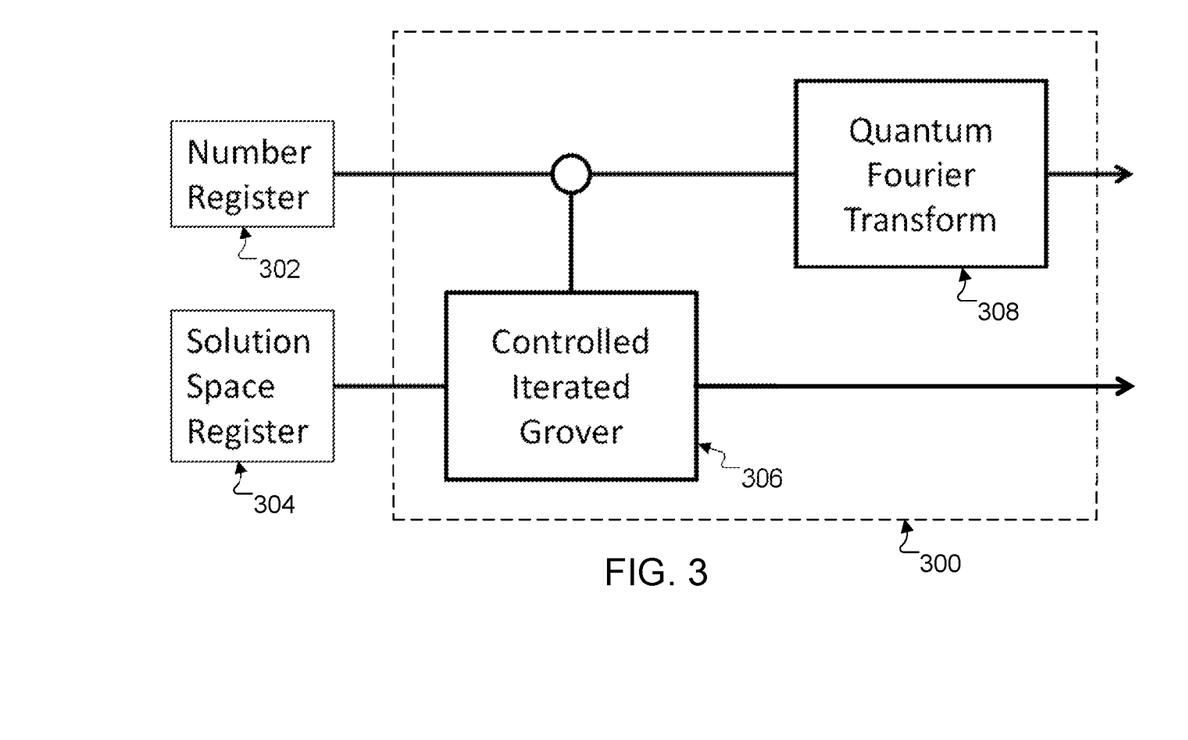
FIG. 3 illustrates an example quantum circuit for performing serial quantum counting and summing according to this disclosure.

FIG. 3 illustrates an example quantum circuit 300 for performing serial quantum counting and summing according to this disclosure. The quantum circuit 300 could, for example, be implemented within the quantum computing system 102 in order to support fast and noise-robust serial quantum counting or summing. Note, however, that the quantum circuit 300 could be used or supported in any other suitable system.

To approximately count a set S in an ambient space X, the Brassard-Hoyer-Tapp algorithm generally includes two steps. In a beginning state (prior to the first step), a system includes a register 302 of numbers up to MM and a register 304 of elements of X in maximally superposed form. This could be accomplished in various ways, such as with Hadamard gates. The contents of the number register 302 are classically an integer between 0 and M−1, but quantum mechanically the register 302 can contain a superposition of any combination of integers between 0 and M−1. The first step of the Brassard-Hoyer-Tapp algorithm performs controlled iterations of a Grover search algorithm 306 for S, where the number of Grover iterations on the state in X is controlled by the number register 302. The second step of the Brassard-Hoyer-Tapp algorithm performs a quantum Fourier transform 308 on the number register 302, which detects the periodicity of the Grover iteration results and thus estimates the size of S.

It is the quantum Fourier transform 308 that is sensitive to noise. Calculation of the quantum Fourier transform 308 involves cancellations between quantum amplitudes whose phases differ by angles of order 1/M. Unfortunately, measuring the size of S up to a relative error 1/N with the Brassard-Hoyer-Tapp algorithm requires M to be of order N $\sqrt{|X|/|S|}$, which could be very large. This fine cancellation, however, is not necessary. In particular, to achieve O(1) relative error, no cancellation is needed. All that is necessary is to try the Grover search algorithm 306 at a variety of sizes until it is between where it almost always finds an element of S and where it almost never finds an element of S. This provides a coarse O(1) estimate of the size of S. Since the Grover search algorithm 306 uses reflections and not fine phase cancellations, this approach is much more robust to the presence of noise in a quantum computing system.

This observation can be generalized by modifying the Brassard-Hoyer-Tapp algorithm as follows. Select an integer R and, for a number m in the register 302, the controlled number of Grover iterations performed by the Grover search algorithm 306 is R×m instead of just m. If the number register 302 is in a pure state (meaning m is an integer between 0 and M−1), R×m iterations of the Grover search algorithm 306 are applied to the solution space register 304 (leaving m in the number register 302). This is sufficient to define the operation of the quantum circuit 300 when the number register 302 is in a superposition state.

The subsequent quantum Fourier transform 308 then measures the periodicity of the results of R, 2R, . . . , M×R Grover iterations. If the true periodicity is less than R, the periodicity will be aliased by this calculation to a false periodicity greater than R. However, if the method described above is used to obtain a coarse estimate of the size of S, the result can be de-aliased and converted to the true periodicity. The result is obtained by choosing R of order $\sqrt{|X|/|S|}$ and M of order N so that, in order to obtain a relative counting error of order $\varepsilon=1/N$, one only needs to accurately handle cancellations between quantum amplitudes whose phases differ by angles of order $\varepsilon=1/N$ (which is independent of the sizes of S and X). Under those conditions, if $f$ is the frequency measured as the output of the quantum Fourier transform 308, an estimate of the count of $|S|$ is given by $|X|$ $\sin^2$ $$\left(\frac{f\pi}{RM}\right).$$

This method is exponentially more robust than the original Brassard-Hoyer-Tapp algorithm.

To generalize or broaden this approach even further, the Brassard-Hoyer-Tapp algorithm can be replaced with a modified version of the more general quantum amplitude estimation algorithm. In the Brassard-Hoyer-Tapp algorithm, an initial step uses a Hadamard gate to produce an equal probability superposition of all states in the solution space X. For use in the quantum amplitude estimation algorithm, this initial step is replaced by a different unitary gate that has non-equal probabilities of states in the solution space X. The quantum amplitude estimation algorithm then produces an estimate of the sum of these probabilities over all states in the solution set S. This can be achieved by replacing the iterated Grover search algorithm 306 with iterations of the more general quantum amplitude amplification algorithm, where the number of iterations is controlled by the number register 302 as described above. Also as described above, the quantum Fourier transform 308 is applied to the number register 302. Due to the quantum Fourier transform 308, the original quantum amplitude estimation algorithm suffers from the same sensitivity to noise as the original Brassard-Hoyer-Tapp algorithm. The modified version of the quantum amplitude estimation algorithm reduces or eliminates this problem by making the number m in the number register 302 control a number R×m of iterations of the quantum amplitude amplification algorithm (for a given multiple R) and then de-aliasing the result using a coarse estimate obtained from the quantum amplitude amplification algorithm.

The summing problem here encompasses the counting problem described above since the counting problem generally involves summing equal probabilities $1/|X|$ over the set S, which gives $|S|/|X|$ (and since $|X|$ in known, $|S|$ can be determined). In particular, the counting problem can be thought of as a specific implementation of the summing problem in which the probabilities of all solutions and non-solutions to the associated decision problem are set to be equal, such as via a Hadamard gate in the quantum computing system 102. With all probabilities being equal, the sum can be determined by counting the number of solutions to the associated decision problem.

Although FIG. 3 illustrates one example of a quantum circuit 300 for performing serial quantum counting and summing, various changes may be made to FIG. 3. For example, each of the Grover search algorithm 306 and the quantum Fourier transform 308 could be implemented using any number of qubits and related components.

Figure 4:
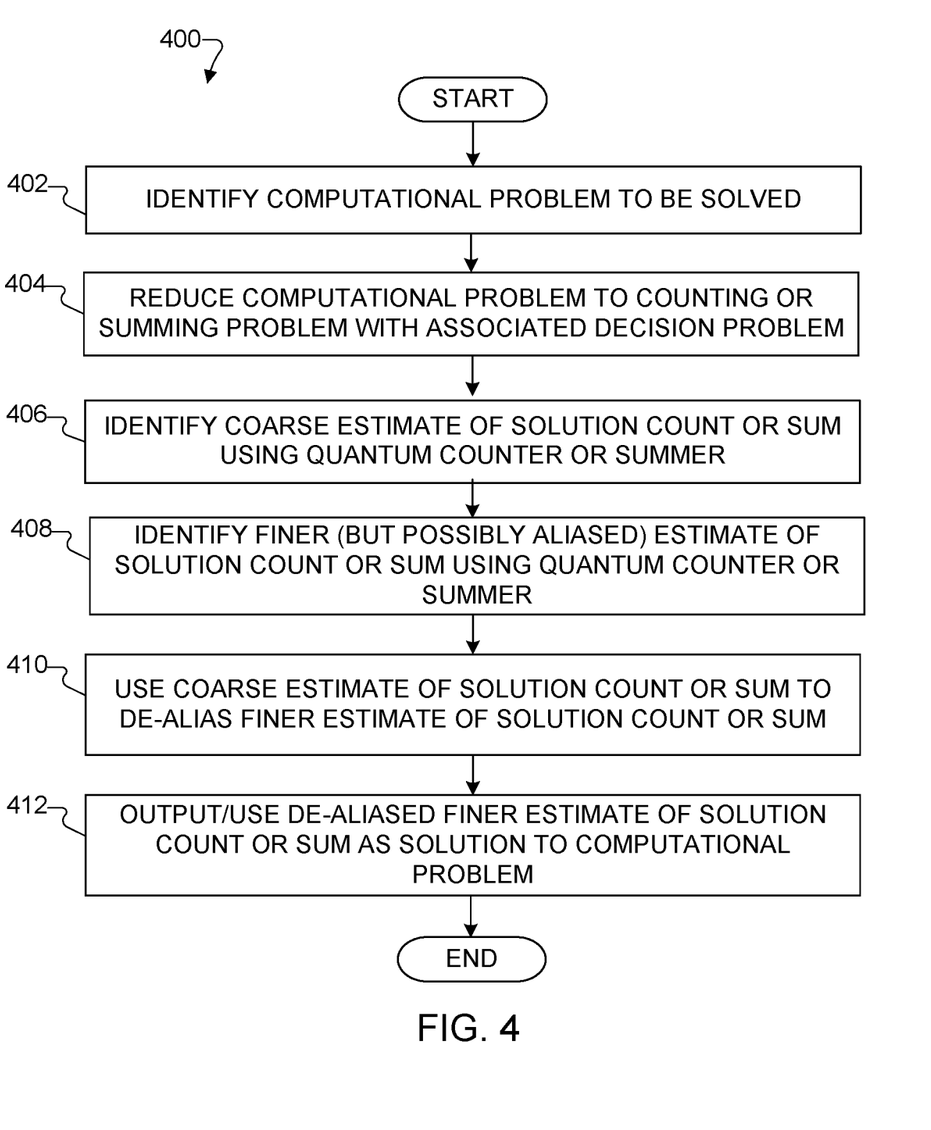
FIG. 4 illustrates an example method for performing serial quantum counting and summing according to this disclosure.

FIG. 4 illustrates an example method 400 for performing serial quantum counting and summing according to this disclosure. For ease of explanation, the method 400 of FIG. 4 is described as being used with the quantum circuit 300 of FIG. 3 in the system 100 of FIG. 1. However, the method 400 could be used with any other suitable device, quantum circuit, and system.

As shown in FIG. 4, a computational problem to be solved is identified at step 402, and the computational problem is reduced to a counting or summing problem having an associated decision problem at step 404. This could include, for example, identifying a computational problem in the NP class involving an average, integration, volume, or percentile and generating a corresponding counting or summing problem in the #P class. As a particular example, this could involve identifying one of the three classes of problems discussed above (tail, integration, or American integration calculations) and identifying a corresponding counting or summing problem. Note that these steps could be performed manually or in a partially or fully automated manner, such as by using a classical computing system 116.

In some embodiments, the computational problem involves finding a percentile of a function $f(x)$ over a large number of inputs x, and the associated decision problem is to decide whether there is an x such that $f(x)$ c for a given c. In other embodiments, the computational problem involves finding an average, sum, or integral of a function $f(x)$ over a large number of inputs x, and the associated decision problem is to decide whether there is a pair (x, y) for which $y<f(x)$. In still other embodiments, the computational problem involves finding a conditional expectation p( ) over a large number of inputs $(x_1, \ldots, x_d)$, where $p(x_1, \ldots, x_d)=f(x_1, \ldots, x_d; \text{average}_{x_{d+1}} p(x_1, \ldots, x_{d+1}))$ for some function $f( )$ over truncated inputs $(x_1, \ldots, x_d)$ $p_j(x_1, \ldots, x_d)$. Here, the computational problem is partially reduced to the problem of computing averages of $p(x_1, \ldots, x_{d+1}) p_i(x_1, \ldots, x_d)$ and $p_i(x_1, \ldots, x_d)$ $p_j(x_1, \ldots, x_d)$ over the truncated inputs $(x_1, \ldots, x_{d+1})$, where $p_i$ and $p_j$ denote regression functions.

The counting or summing problem is solved as shown in steps 406-310. For example, a coarse estimate of the solution count or sum is identified using a quantum counter or summer at step 406. In some embodiments, the coarse estimate of the count (the number of solutions) can be obtained using the Grover search algorithm 306, which is provided a sequence of test values. Each test value is checked by running a Grover search for the associated solution set, calibrated to the size of the solution set being approximately equal to the test value. A finer (but possibly aliased) estimate of the solution count or sum is identified at step 408. In some embodiments, the finer estimate is determined using a modified Brassard-Hoyer-Tapp search algorithm as described above, where each Grover iteration in the standard Brassard-Hoyer-Tapp search algorithm is replaced by a certain multiple (R) of Grover iterations. R is of the order $\sqrt{|X|/|S|}$. The coarse estimate is used to de-alias the finer estimate at step 410. In some embodiments, the coarse estimate of the size of S is used to de-alias the periodicity of the results of the R, 2R, . . . , M×R Grover iterations in order to identify the true periodicity. Again, however, to generalize or broaden this approach, the Brassard-Hoyer-Tapp algorithm can be replaced with a modified version of the more general quantum amplitude estimation algorithm. The modified version of the quantum amplitude estimation algorithm is described above and can still be used to identify a coarse estimate and identify a finer (but possibly aliased) estimate, and the finer estimate can then be de-aliased.

The de-aliased finer estimate of the solution count or sum is output or used as a solution to the computational problem at step 412. This could include, for example, the quantum computing system 102 or the classical computing system 116 using the de-aliased finer estimate of the solution count or sum as the solution to the computational problem in the NP class.

Although FIG. 4 illustrates one example of a method 400 for performing serial quantum counting and summing, various changes may be made to FIG. 4. For example, while shown as a series of steps, various steps in FIG. 4 could overlap, occur in parallel, or occur any number of times. Also, steps 406-408 in FIG. 4 could be performed using a quantum computing system that includes at least one quantum circuit configured to perform these operations. The other steps in FIG. 4 may or may not be performed by the quantum computing system, such as when certain functions are performed by a classical computing system that interacts with the quantum computing system via an input control device 112 and a readout control device 114.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for solving a computational problem that is reducible to a problem of summing probabilities over all solutions to an associated decision problem, the method comprising:

using a quantum computer comprising at least one quantum circuit to identify a coarse estimate of a sum of the probabilities over all solutions to the associated decision problem;

using the quantum computer to identify a finer estimate of the sum of the probabilities over all solutions to the associated decision problem, wherein the finer estimate of the sum of the probabilities over all solutions is determined using a quantum amplitude estimation algorithm in which (i) a number m in a number register controls a number R×m of quantum amplitude amplification iterations to be applied to a solution space register, where R is a specified multiple, and (ii) a quantum Fourier transform is applied to the number register;

using the coarse estimate of the sum of the probabilities over all solutions to de-alias the finer estimate of the sum of the probabilities over all solutions; and outputting a solution to the computational problem determined using the de-aliased finer estimate of the sum of the probabilities over all solutions to the decision problem.

2. The method of claim 1, wherein:

the computational problem is reducible to a problem of counting a number of solutions to the associated decision problem by making the probabilities of all solutions and probabilities of all non-solutions to the associated decision problem equal via a Hadamard gate in the quantum computer; and the quantum amplitude estimation algorithm comprises performing a controlled number of Grover iterations in a modified Brassard-Hoyer-Tapp quantum counting algorithm using the specified multiple R.

3. The method of claim 1, wherein:
the computational problem involves finding a percentile of a function $f(x)$ over inputs x; and
the associated decision problem involves deciding whether there is an input x such that $f(x)<c$ for a given value of c.

4. The method of claim 1, wherein:
the computational problem involves finding an average, sum, or integral of a function $f(x)$ over inputs x; and
the associated decision problem involves deciding whether there is a pair (x, y) for which $y<f(x)$.

5. The method of claim 1, wherein:
the computational problem involves finding a conditional expectation p( ) over inputs $(x_1, \ldots, x_d)$, where $p(x_1, \ldots, x_d)=f(x_1, \ldots, x_d)$; $\text{average}_{x_{d+1}} p(x_1, \ldots, x_{d+1}))$ for a function f( ) over truncated inputs $(x_1, \ldots, x_d;$ a); and
the associated decision problem involves computing averages of $p(x_1 \ldots, x_{d+1})p_i(x_1, \ldots, x_d)$ and $p_i(x_1, \ldots, x_d)p_j(x_1, \ldots, x_d)$ over the truncated inputs $(x_1, \ldots, x_{d+1})$, where $p_i$ and $p_j$ are regression functions.

6. The method of claim 1, wherein:
the coarse estimate is identified using a sequence of test values, each of which is checked by running the quantum amplitude estimation algorithm for a solution set; and
the quantum amplitude estimation algorithm is calibrated to a size of the solution set being approximately equal to the test value.

7. The method of claim 1, wherein the multiple R of the quantum amplitude amplification iterations is of an order of a square root of a size of an ambient solution space relative to a size of a solution set.

8. The method of claim 1, wherein:
the method also comprises identifying multiple disjoint, enumerable, approximately equally-sized, pseudo-random sets such that every solution to the decision problem is in one of the sets;
the coarse estimate comprises multiple coarse estimates identified in parallel for the sets;
the finer estimate comprises multiple finer estimates identified in parallel for the sets;
the de-aliased estimate comprises multiple de-aliased estimates identified in parallel for the sets, the de-aliased estimates identifying partial sums of probabilities of the solutions within the sets; and
the method further comprises summing the partial sums of probabilities to identify a total sum of probabilities representing the solution to the computational problem.

9. The method of claim 8, wherein:
the sets are contained in an ambient set X; and
each set $R_i$ is defined by an enumeration function $r_i$: $Z_i \rightarrow R_i$, where $r_i(z)=\theta(Pz+i) \mod |X|$, $Z_i$ consists of all numbers less than $|X|/P$, X consists of all numbers less than $|X|$, and $\theta$ is a random number relatively prime to $|X|$.

10. An apparatus comprising:
a quantum computer comprising at least one quantum circuit;
wherein, to solve a computational problem that is reducible to a problem of summing probabilities over all solutions to an associated decision problem, the quantum computer is configured to:
  identify a coarse estimate of a sum of the probabilities over all solutions to the associated decision problem;
  identify a finer estimate of the sum of the probabilities over all solutions to the associated decision problem,
  wherein the finer estimate of the sum of the probabilities over all solutions is determined using a quantum amplitude estimation algorithm in which (i) a number m in a number register controls a number R×m of quantum amplitude amplification iterations to be applied to a solution space register, where R is a specified multiple, and (ii) a quantum Fourier transform is applied to the number register; and
  use the coarse estimate of the sum of the probabilities over all solutions to de-alias the finer estimate of the sum of the probabilities over all solutions;
wherein a solution to the computational problem is determined using the de-aliased finer estimate of the sum of the probabilities over all solutions to the decision problem.

11. The apparatus of claim 10, wherein:
the computational problem is reducible to a problem of counting a number of solutions to the associated decision problem, the quantum computer configured to make the probabilities of all solutions and probabilities of all non-solutions to the associated decision problem equal via a Hadamard gate in the quantum computer; and
to perform the quantum amplitude estimation algorithm, the quantum computer is configured to perform a controlled number of Grover iterations in a modified Brassard-Hoyer-Tapp quantum counting algorithm using the specified multiple R.

12. The apparatus of claim 10, wherein:
the computational problem involves finding a percentile of a function $f(x)$ over inputs x; and
the associated decision problem involves deciding whether there is an input x such that $f(x)<c$ for a given value of c.

13. The apparatus of claim 10, wherein:
the computational problem involves finding an average, sum, or integral of a function $f(x)$ over inputs x; and
the associated decision problem involves deciding whether there is a pair (x, y) for which $y<f(x)$.

14. The apparatus of claim 10, wherein:
the computational problem involves finding a conditional expectation p( ) over inputs $(x_1, \ldots, x_d)$, where $p(x_1, \ldots, x_d)=f(x_1, \ldots, x_d)$; $\text{average}_{x_{d+1}} p(x_1, \ldots, x_{d+1}))$ for a function f( ) over truncated inputs $(x_1, \ldots, x_d;$ a); and
the associated decision problem involves computing averages of $p(x_1 \ldots, x_{d+1})p_i(x_1, \ldots, x_d)$ and $p_i(x_1, \ldots, x_d)p_j(x_1, \ldots, x_d)$ over the truncated inputs $(x_1, \ldots, x_{d+1})$, where $p_i$ and $p_j$ are regression functions.

15. The apparatus of claim 10, wherein:
the quantum computer is configured to identify the coarse estimate using a sequence of test values, each of which is checked by running the quantum amplitude estimation algorithm for a solution set; and
the quantum amplitude estimation algorithm is calibrated to a size of the solution set being approximately equal to the test value.

16. The apparatus of claim 10, wherein the multiple R of the quantum amplitude amplification iterations is of an order of a square root of a size of an ambient solution space relative to a size of a solution set.

17. The apparatus of claim 10, wherein the quantum computer is configured to:
identify multiple coarse estimates in parallel for multiple disjoint, enumerable, approximately equally-sized, pseudo-random sets, wherein every solution to the decision problem is in one of the sets;

identify multiple finer estimates in parallel for the sets; and identify multiple de-aliased estimates in parallel for the sets, the de-aliased estimates identifying partial sums of probabilities of the solutions within the sets; and wherein the solution to the computational problem is determined based on a sum of the partial sums of probabilities.

18. The apparatus of claim 17, wherein:

the sets are contained in an ambient set X; and each set $R_i$ is defined by an enumeration function $r_i$: $Z_i \rightarrow R_i$, where $r_i(z)=\theta(Pz+i) \mod |X|$, $Z_i$ consists of all numbers less than $|X|/P$, X consists of all numbers less than $|X|$, and $\theta$ is a random number relatively prime to $|X|$.

19. A system comprising:

a quantum computer comprising at least one quantum circuit; and a classical computer comprising at least one processor configured to execute instructions stored in at least one memory;

wherein, to solve a computational problem that is reducible to a problem of summing probabilities over all solutions to an associated decision problem:

the quantum computer is configured to identify a coarse estimate of a sum of the probabilities over all solutions to the associated decision problem;

the quantum computer is configured to identify a finer estimate of the sum of the probabilities over all solutions to the associated decision problem, wherein the finer estimate of the sum of the probabilities over all solutions is determined using a quantum amplitude estimation algorithm in which (i) a number m in a number register controls a number R×m of quantum amplitude amplification iterations to be applied to a solution space register, where R is a specified multiple, and (ii) a quantum Fourier transform is applied to the number register; and the classical computer is configured to use the coarse estimate of the sum of the probabilities over all solutions to de-alias the finer estimate of the sum of the probabilities over all solutions;

wherein a solution to the computational problem is determined using the de-aliased finer estimate of the sum of the probabilities over all solutions to the decision problem.

20. The system of claim 19, wherein:

the computational problem is reducible to a problem of counting a number of solutions to the associated decision problem, the quantum computer configured to make the probabilities of all solutions and probabilities of all non-solutions to the associated decision problem equal via a Hadamard gate in the quantum computer; and to perform the quantum amplitude estimation algorithm, the quantum computer is configured to perform a controlled number of Grover iterations in a modified Brassard-Hoyer-Tapp quantum counting algorithm using the specified multiple R.

21. The system of claim 19, wherein:

the computational problem involves finding a percentile of a function $f(x)$ over inputs x; and the associated decision problem involves deciding whether there is an input x such that $f(x)<c$ for a given value of c.

22. The system of claim 19, wherein:

the computational problem involves finding an average, sum, or integral of a function $f(x)$ over inputs x; and the associated decision problem involves deciding whether there is a pair (x, y) for which $y<f(x)$.

23. The system of claim 19, wherein:

the computational problem involves finding a conditional expectation p( ) over inputs $(x_1, \ldots, x_d)$, where $p(x_1, \ldots, x_d)=f(x_1, \ldots, x_d;$ average$_{x_{d+1}} p(x_1, \ldots, x_{d+1}))$ for a function f( ) over truncated inputs $(x_1, \ldots, x_d;$ a); and the associated decision problem involves computing averages of $p(x_1, \ldots, x_{d+1}) p_i(x_1, \ldots, x_d)$ and $p_i(x_1, \ldots, x_d) p_j(x_1, \ldots, x_d)$ over the truncated inputs $(x_1, \ldots, x_{d+1})$, where $p_i$ and $p_j$ are regression functions.

24. The system of claim 19, wherein:

the quantum computer is configured to identify the coarse estimate using a sequence of test values, each of which is checked by running the quantum amplitude estimation algorithm for a solution set; and the quantum amplitude estimation algorithm is calibrated to a size of the solution set being approximately equal to the test value.

25. The system of claim 19, wherein the multiple R of the quantum amplitude amplification iterations is of an order of a square root of a size of an ambient solution space relative to a size of a solution set.

26. The system of claim 19, wherein:

the quantum computer is configured to:

identify multiple coarse estimates in parallel for multiple disjoint, enumerable, approximately equally-sized, pseudo-random sets, wherein every solution to the decision problem is in one of the sets; and identify multiple finer estimates in parallel for the sets; and the classical computer is configured to identify multiple de-aliased estimates in parallel for the sets, the de-aliased estimates identifying partial sums of probabilities of the solutions within the sets; and the solution to the computational problem is determined based on a sum of the partial sums of probabilities.

27. The system of claim 26, wherein:

the sets are contained in an ambient set X; and each set $R_i$ is defined by an enumeration function $r_i$: $Z_i \rightarrow R_i$, where $r_i(z)=\theta(Pz+i) \mod |X|$, $Z_i$ consists of all numbers less than $|X|/P$, X consists of all numbers less than $|X|$, and $\theta$ is a random number relatively prime to $|X|$.

* * * * *